United States Patent
Katsura et al.

(10) Patent No.: US 9,809,276 B2
(45) Date of Patent: Nov. 7, 2017

(54) ELECTRIC BICYCLE DERAILLEUR CONTROL SYSTEM

(71) Applicant: Shimano Inc., Sakai, Osaka (JP)

(72) Inventors: Takafumi Katsura, Osaka (JP); Keijiro Nishi, Osaka (JP); Yuta Mizutani, Osaka (JP); Hiroshi Tachibana, Osaka (JP)

(73) Assignee: Shimano Inc., Osaka (JP)

( * ) Notice: Subject to any disclaimer, the term of this patent is extended or adjusted under 35 U.S.C. 154(b) by 47 days.

(21) Appl. No.: 15/055,998

(22) Filed: Feb. 29, 2016

(65) Prior Publication Data

US 2017/0247082 A1    Aug. 31, 2017

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/132* | (2010.01) |

(52) U.S. Cl.
CPC ................... *B62M 9/132* (2013.01)

(58) Field of Classification Search
CPC ...... B62M 25/08; B62M 9/122; B62M 9/123; B62M 9/132; B62M 1/36
USPC ...................................... 474/80, 82
See application file for complete search history.

(56) References Cited

U.S. PATENT DOCUMENTS

| | | | | |
|---|---|---|---|---|
| 3,929,025 | A * | 12/1975 | Perry | B62M 9/123 474/70 |
| RE30,758 | E * | 10/1981 | Lang | B62M 25/08 280/236 |
| 4,599,079 | A * | 7/1986 | Chappell | B62M 9/123 474/80 |
| 4,608,035 | A * | 8/1986 | Reader | B62M 1/36 280/217 |
| 4,946,425 | A * | 8/1990 | Buhlmann | B62M 9/122 192/142 R |
| 4,952,196 | A * | 8/1990 | Chilcote | B62M 9/08 474/70 |
| 5,213,548 | A * | 5/1993 | Colbert | B62M 25/08 280/238 |
| 5,480,356 | A * | 1/1996 | Campagnolo | B62M 9/122 280/238 |
| 5,599,244 | A * | 2/1997 | Ethington | B62M 9/122 280/261 |
| 5,681,234 | A * | 10/1997 | Ethington | B62M 9/122 280/261 |
| 6,293,882 | B1 * | 9/2001 | Kitamura | B62M 25/08 474/70 |
| 6,431,573 | B1 * | 8/2002 | Lerman | B62M 9/08 280/261 |

(Continued)

*Primary Examiner* — Henry Liu
(74) *Attorney, Agent, or Firm* — Global IP Counselors, LLP (57) ABSTRACT

An electric bicycle derailleur control system is basically provided with a derailleur, a detecting device and a controller. The derailleur includes a chain guide and an electrical actuator. The chain guide is configured to displace a bicycle chain. The electrical actuator is operatively coupled to the chain guide to displace the chain guide. The detecting device is configured to detect information related to a reaction force of the bicycle chain. The controller is configured to control the electrical actuator in accordance with detected information.

16 Claims, 7 Drawing Sheets

(56) References Cited

U.S. PATENT DOCUMENTS

| | | | | |
|---|---|---|---|---|
| 6,459,222 B1* | 10/2002 | Chen | ................ | B62M 6/45 |
| | | | | 180/206.2 |
| 6,543,799 B2* | 4/2003 | Miyoshi | ................ | B62K 25/04 |
| | | | | 280/283 |
| 7,704,173 B2* | 4/2010 | Ichida | ................ | B62M 9/132 |
| | | | | 474/80 |
| 7,814,800 B2* | 10/2010 | Roovers | ................ | B62M 6/50 |
| | | | | 73/760 |
| 8,512,182 B2* | 8/2013 | Tam | ................ | B62M 11/04 |
| | | | | 474/78 |
| 8,768,585 B2* | 7/2014 | Cheng | ................ | B62M 9/123 |
| | | | | 280/260 |
| 9,003,900 B2* | 4/2015 | Hsiao | ................ | G01L 5/102 |
| | | | | 73/862.69 |
| 9,381,974 B2* | 7/2016 | Katsura | ................ | B62M 9/122 |
| 2005/0176537 A1* | 8/2005 | Matsumoto | ................ | B62M 11/145 |
| | | | | 474/80 |
| 2012/0149509 A1* | 6/2012 | Capogna | ................ | B62M 9/122 |
| | | | | 474/80 |
| 2012/0265414 A1* | 10/2012 | Cheng | ................ | B62M 9/123 |
| | | | | 701/55 |
| 2014/0121047 A1* | 5/2014 | Katsura | ................ | B62M 9/122 |
| | | | | 474/80 |
| 2014/0287856 A1* | 9/2014 | Kuwayama | ................ | B62M 9/132 |
| | | | | 474/80 |
| 2015/0274255 A1* | 10/2015 | Capogna | ................ | B62M 9/122 |
| | | | | 474/80 |

\* cited by examiner

ELECTRIC BICYCLE DERAILLEUR CONTROL SYSTEM

BACKGROUND

Field of the Invention

This invention generally relates to an electric bicycle derailleur control system. More specifically, the present invention relates to an electric bicycle derailleur control system that displaces a chain guide using an electrical actuator in accordance with detected information.

Background Information

Recently, some bicycles have been provided with an electrical drivetrain to make riding easier for the rider. The electrical drivetrain often includes one or two electric derailleurs for moving a bicycle chain between sprockets. The electric derailleurs usually have a chain guide and an electrical actuator that displaces the chain guide in a lateral direction to move the bicycle chain between sprockets. Typically, a rider operates a shifter to actuate the electrical actuator of the electric derailleur to perform a shifting operation.

SUMMARY

Generally, the present disclosure is directed to various features of an electric bicycle derailleur control system that includes a chain guide which is moved in a lateral direction to move a bicycle chain between sprockets. In a conventional bicycle derailleur control system, the lateral displacement amount of the chain guide in each gear position is predetermined.

It has been discovered that chain tension varies during ride of a bicycle. If the chain tension is large, then the chain guide of the derailleur needs to be displaced more because a reaction force of the chain interferes with the displacement of the chain guide and disturbs the shifting operation of the chain guide. In contrast, if the chain tension is small, then it is necessary to avoid displacing the chain guide of the derailleur too much because the chain might drop off from the sprocket due to a small reaction force of the chain.

One aspect is to provide an electric bicycle derailleur control system in which a displacement amount of a chain guide is appropriately determined in accordance with a detected reaction force of the chain. For example, if a detected reaction force of the chain is large, then the displacement amount of the chain guide is controlled to be large in order to ensure engagement of the chain with a target sprocket against the reaction force of the chain. In contrast, if a detected reaction force of the chain is small, then the displacement amount of the chain guide is controlled to be smaller in order to avoid displacing the chain guide of the front derailleur too much.

In view of the state of the known technology and in accordance with a first aspect of the present disclosure, an electric bicycle derailleur control system is provided that basically comprises a derailleur, a detecting device and a controller. The derailleur includes a chain guide and an electrical actuator. The chain guide is configured to displace a bicycle chain. The electrical actuator is operatively coupled to the chain guide to displace the chain guide. The detecting device is configured to detect information related to a reaction force of the bicycle chain. The controller is configured to control the electrical actuator in accordance with the detected information.

In accordance with a second aspect of the present invention, the electric bicycle derailleur control system according to the first aspect is configured so that the controller is further configured to control the electrical actuator so that a displacement amount of the chain guide during a shifting operation is a first displacement amount upon the detected information of the detecting device indicating a detected chain reaction force being smaller than a first predetermined amount, and so that the displacement amount of the chain guide is a second displacement amount that is greater than the first displacement amount upon the detected information of the detecting device indicating a detected chain reaction force being equal to or above the first predetermined amount.

In accordance with a third aspect of the present invention, the electric bicycle derailleur control system according to the second aspect is configured so that the controller is further configured to control the electrical actuator to displace the chain guide, that is in a shifting operation in which the displacement amount of the chain guide is the second displacement amount, in an opposite direction from an existing displacement direction upon the detected information of the detecting device indicating a detected chain reaction force decreasing rate that is equal to or above a predetermined chain reaction force decreasing rate.

In accordance with a fourth aspect of the present invention, the electric bicycle derailleur control system according to the second or third aspect is configured so that the controller is further configured to control the electrical actuator to stop displacing the chain guide, that is in a shifting operation in which the displacement amount of the chain guide is the second displacement amount, in an existing displacement direction upon the detected information of the detecting device indicating a detected chain reaction force decreasing rate that is equal to or above a predetermined chain reaction force decreasing rate.

In accordance with a fifth aspect of the present invention, the electric bicycle derailleur control system according to the third aspect is configured so that the controller is further configured to control the electrical actuator to displace the chain guide in the opposite direction after the detecting device detects the chain reaction force decreasing rate within a prescribed time period.

In accordance with a sixth aspect of the present invention, the electric bicycle derailleur control system according to the third aspect is configured so that the controller is further configured to control the electrical actuator to stop displacing the chain guide after the detecting device detects the chain reaction force decreasing rate.

In accordance with a seventh aspect of the present invention, the electric bicycle derailleur control system according to any one of the first to sixth aspects is configured so that the electrical actuator includes an electrical motor; and the controller is further configured to control a rotational degree of an output shaft of the motor based on the detected information.

In accordance with an eighth aspect of the present invention, the electric bicycle derailleur control system according to any one of the first to seventh aspects is configured so that the detecting device includes a strain gauge disposed on a part of the derailleur that receives a reaction force from the chain guide displacing the bicycle chain.

In accordance with a ninth aspect of the present invention, the electric bicycle derailleur control system according to the eighth aspect is configured so that the part of the derailleur includes at least one of the chain guide, a linkage part of a linkage assembly interconnecting the electrical actuator to the chain guide, and a gear connected to a motor of the electrical actuator.

In accordance with a tenth aspect of the present invention, the electric bicycle derailleur control system according to the eighth aspect is configured so that the controller is further configured to control the electrical actuator to displace the chain guide to a trim position upon the detected information of the detecting device indicating a detected chain reaction force being smaller than a predetermined amount for more than a predetermined time period.

In accordance with an eleventh aspect of the present invention, the electric bicycle derailleur control system according to any one of the first to seventh aspects is configured so that the detecting device includes a current sensor that is configured to measure current of the electrical actuator.

In accordance with a twelfth aspect of the present invention, the electric bicycle derailleur control system according to the eleventh aspect is configured so that the controller is further configured to control the electrical actuator to displace the chain guide according to a detected current value of the electrical actuator by the current sensor such that a displacement amount of the chain guide varies based on the detected current value of the electrical actuator.

In accordance with a thirteenth aspect of the present invention, the electric bicycle derailleur control system according to any one of the first to seventh aspects is configured so that the detecting device includes a torque sensor that is configured to measure torque of a bicycle component.

In accordance with a fourteenth aspect of the present invention, the electric bicycle derailleur control system according to the thirteenth aspect is configured so that the bicycle component includes at least one of a crank axle, a crank arm, a pedal and a rear hub.

In accordance with a fifteenth aspect of the present invention, an electric bicycle derailleur control system is provided that basically comprises a derailleur, a detecting device and a controller. The derailleur includes a chain guide and an electrical actuator. The chain guide is configured to displace a bicycle chain. The electrical actuator is operatively coupled to the chain guide to displace the chain guide. The detecting device is configured to detect information related to a reaction force of the bicycle chain. The controller is configured to control the electrical actuator so that the chain guide is displaced from a rest position to a first shift position when the detected information indicates a detected chain reaction force being smaller than a first predetermined amount, and so that the chain guide is displaced from the rest position to a second shift position that is further from the rest position than the first shift position when the detected information indicates the detected chain reaction force being equal to or above the first predetermined amount.

In accordance with a sixteenth aspect of the present invention, an electric bicycle derailleur control system is provided that basically comprises a derailleur, a torque sensor and a controller. The derailleur includes a chain guide and an electrical actuator. The chain guide is configured to displace a bicycle chain. The electrical actuator is operatively coupled to the chain guide to displace the chain guide. The torque sensor is configured to measure torque of a bicycle component. The controller is configured to control the electrical actuator to displace the chain guide according to a detected torque of the bicycle component by the torque sensor such that the chain guide is displaced from a rest position to a first shift position when the detected torque is smaller than a first predetermined amount, and such that the chain guide is displaced from the rest position to a second shift position that is further from the rest position than the first shift position when the detected torque is equal to or above the first predetermined amount.

Also other objects, features, aspects and advantages of the disclosed electric bicycle derailleur control system will become apparent to those skilled in the art from the following detailed description, which, taken in conjunction with the annexed drawings, discloses one illustrative embodiment of the electric bicycle derailleur control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
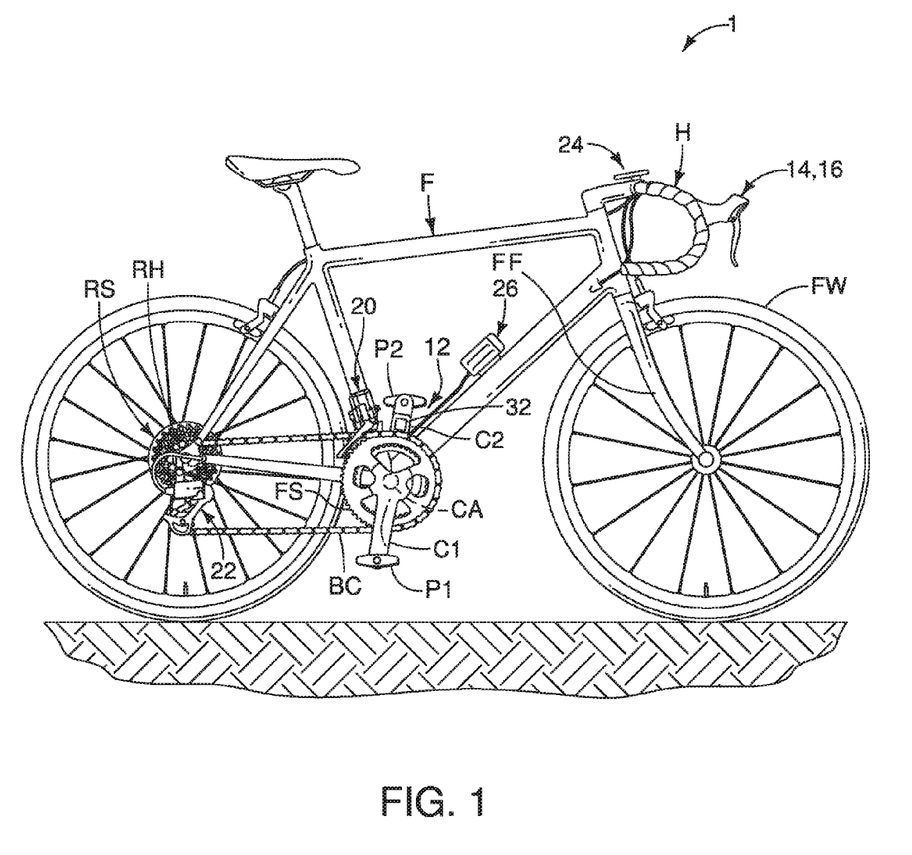
FIG. 1 is a side elevational view of a bicycle that is equipped with an electric bicycle derailleur control system in accordance with one illustrated embodiment.

Referring initially to FIG. 1, a bicycle 1 is illustrated that is equipped with an electric bicycle derailleur control system 12 in accordance with a first embodiment. In FIG. 1, the bicycle 1 is a road bicycle basically having a bicycle frame F, a front fork FF, a drop handlebar H, a front wheel FW and a rear wheel RW. However, the electric bicycle derailleur control system 12 discussed herein is not limited to the illustrated bicycle, but rather can be adapted to other types of bicycles such as a suspension (off road) bicycle. Also the bicycle 1 includes other various bicycle components, which are not relevant to the understanding of the electric bicycle derailleur control system 12 of this present disclosure. Thus, these other various bicycle components of the bicycle 1 will not be discussed herein.

Here, the bicycle frame F that supports a drivetrain of the bicycle 1. The drivetrain of the bicycle 1 is a chain drive, which is conventionally used in bicycles. The drivetrain of the bicycle 1 includes a plurality of front sprockets FS, a plurality of rear sprockets RS and a bicycle chain BC. The bicycle chain BC is engaged with one of the front sprockets FS and one of the rear sprockets RS to transmit rotation of the engaged one of the front sprockets FS to the engaged one of the rear sprockets RS. More specifically, the front sprockets FS are rotatably mounted to the bicycle frame F by a crank axle CA in a conventional manner. The crank axle CA has a first crank arm C1 mounted to a first end of the crank axle CA, and a second crank arm C2 mounted to a second end of the crank axle CA. The first crank arm C1 has a first pedal P1 rotatably mounted to a free end of the first crank arm C1. The second crank arm C2 has a second pedal P2 rotatably mounted to a free end of the second crank arm C2. The rear sprockets RS is attached to a rear hub RH of the rear wheel RW in a conventional manner. Thus, a pedaling action transmits a pedaling force from the front sprockets FS to the rear sprockets RS via the bicycle chain BC such that the rear wheel RW is rotated.

In the illustrated embodiment, as seen in FIG. 1, the electric bicycle derailleur control system 12 basically comprises a pair of shift operating devices 14 and 16 (only one seen in FIG. 1), a front electrical bicycle derailleur 20, a rear electrical bicycle derailleur 22, a cycle computer 24 and a power source 26. The electric bicycle derailleur control system 12 also comprises at least one detecting device 30 and/or 32 provided on at least one bicycle component (e.g., the crank axle CA, the first crank arm C1, the second crank arm C2, the first pedal P1, the second pedal P2, the rear hub RH, the front electrical bicycle derailleur 20 and the rear electrical bicycle derailleur 22). However, the electric bicycle derailleur control system 12 is not limited to this particular arrangement, and does not necessarily need all of the devices. For example, while the electric bicycle derailleur control system 12 is illustrated as operating both the front electrical bicycle derailleur 20 and the rear electrical bicycle derailleur 22, it will be apparent to those skilled in the bicycle field that the electric bicycle derailleur control system 12 can be configured to control only one of the front electrical bicycle derailleur 20 and the rear electrical bicycle derailleur 22. Also the electric bicycle derailleur control system 12 could have only a single shift operating device operating both the front electrical bicycle derailleur 20 and the rear electrical bicycle derailleur 22 using one or more of the detecting devices 30 and 32 discussed below. For the sake of brevity, the front electrical bicycle derailleur 20 and the rear electrical bicycle derailleur 22 will be referred to hereinafter as the derailleur 20 and the derailleur 22, respectively.

Figure 2:
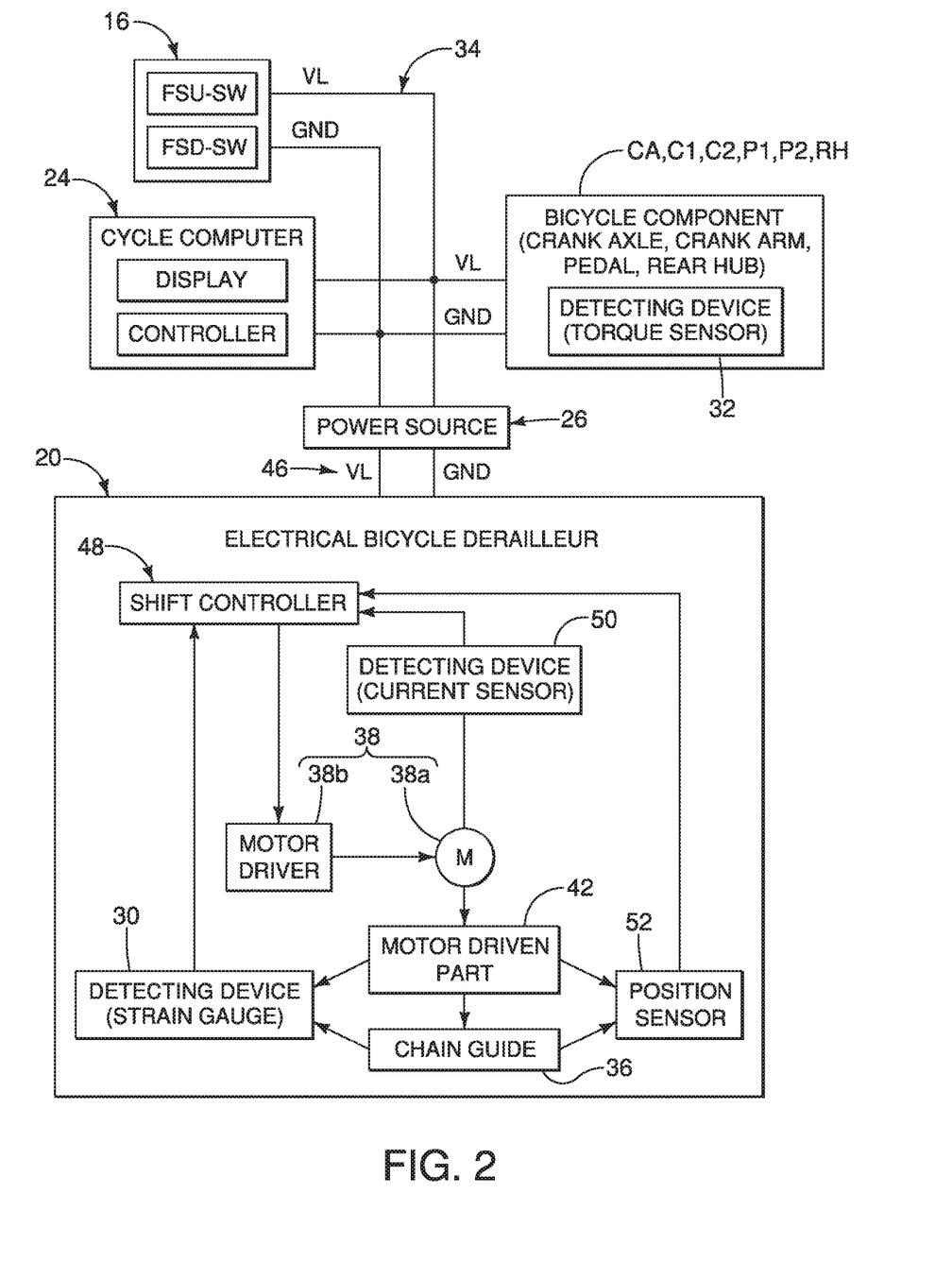
FIG. 2 is a block diagram of electric bicycle derailleur control system in accordance with the illustrated embodiment.

Referring to FIG. 2, the electric bicycle derailleur control system 12 is diagrammatically illustrated for controlling the front electrical bicycle derailleur 20. However, the same configuration can be provided for the rear electrical bicycle derailleur 22. Thus, the electric bicycle derailleur control system 12 is basically provided with a derailleur (one of the derailleurs 20 and 22), a detecting device (one or more of the detecting devices 30 and 32) and a controller (one provided on the derailleurs 20 or 22, or a remote controller provided on a bicycle component such as the cycle computer 24). Here, in the illustrated embodiment, the electric bicycle derailleur control system 12 uses electric power line communication technology to communicate between the electric bicycle components as well as to supply electrical power from the power source 26 to the electric bicycle components. Of course, the electric bicycle derailleur control system 12 is not limited to uses electric power line communication technology. Rather, it will be apparent to those skilled in the bicycle field that the electric bicycle derailleur control system 12 can use signal lines and/or wireless communication technology to communicate between the electric bicycle components instead of or in conjunction with electric power line communication technology.

Still referring to FIG. 2, the shift operating device 16 includes a front derailleur upshift switch FSU-SW and a front derailleur downshift switch FSD-SW. The front derailleur upshift switch FSU-SW is actuated by an operating member such as a lever or a button. Similarly, the front derailleur downshift switch FSD-SW is actuated by an operating member such as a lever or a button, which can be the same one used for the front derailleur upshift switch FSU-SW or a separate one. The shift operating device 16 is connected to the power source 26 by a power line 34. The shift operating device 16 and the power source 26 each includes a power line communication module (not shown) for carrying out power line communications. While the power line 34 is illustrated as being directly connected to the power source 26, it will be apparent to those skilled in the bicycle field that an electrical wiring junction can be provided between the power source 26 and the shift operating device 16 and the other electric bicycle components electrically connected to the power source 26 to receive electrical power from the power source 26.

Figure 3:
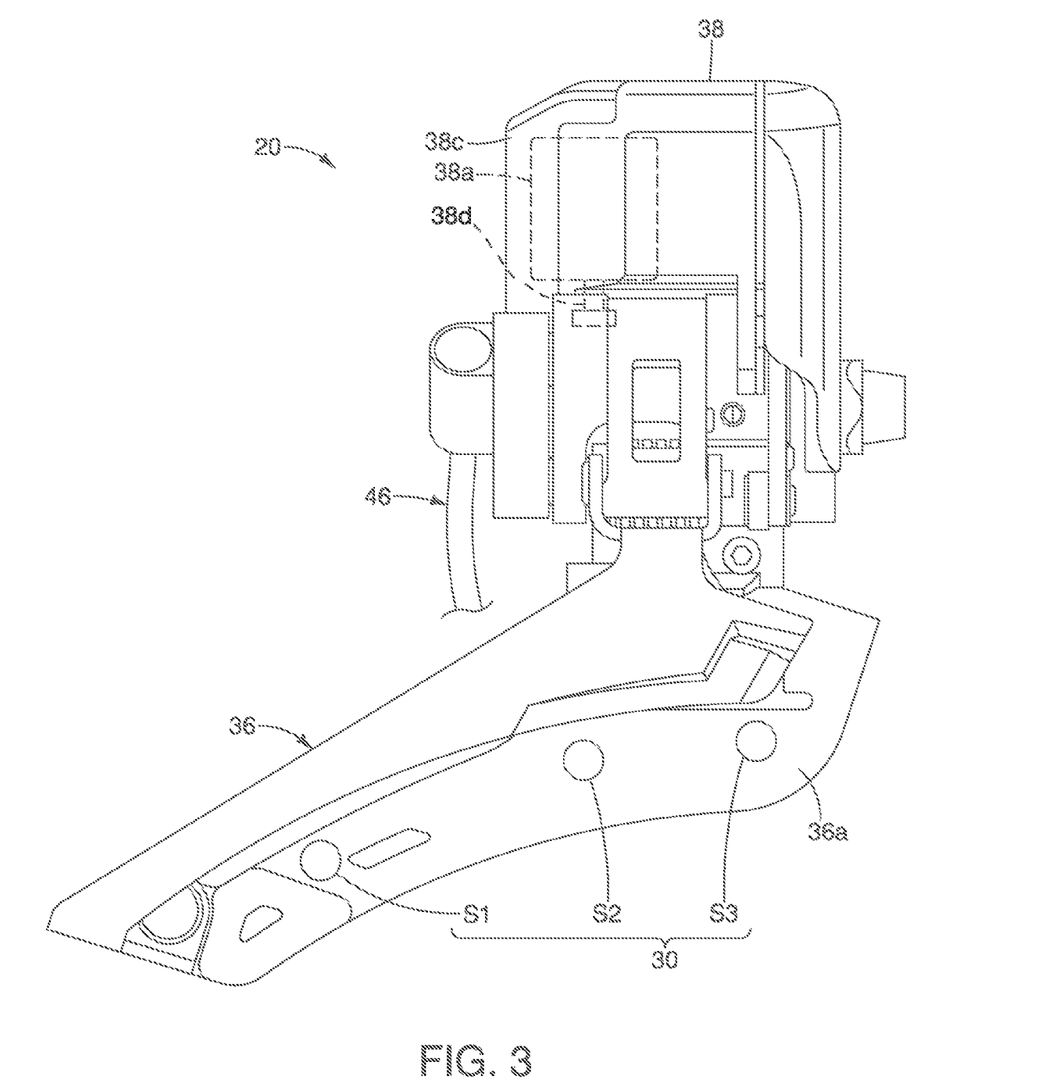
FIG. 3 is an enlarged outer side elevational view of the front derailleur illustrated in FIG. 1.
Figure 6:
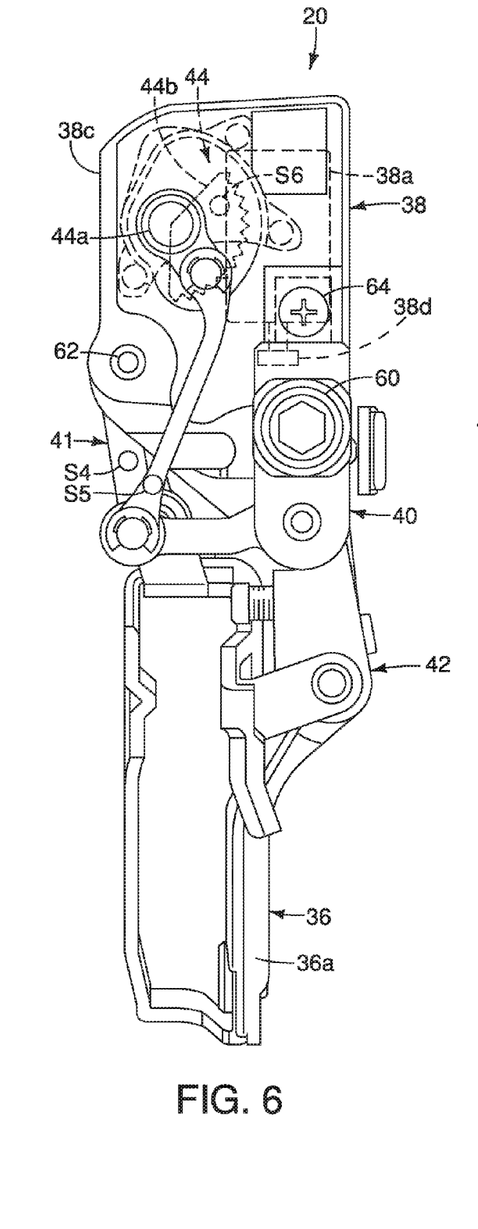
FIG. 6 is an front elevational view of the front derailleur illustrated in FIG. 3 having the chain guide in the retracted position, and the front cover removed and a portion of the output shaft cover broken away.

Still referring to FIGS. 2 and 3, the derailleur 20 includes a chain guide 36 and an electrical actuator 38. The derailleur 20 further includes a base member 40, a first linkage 41 and a second linkage 42. The base member 40 is configured to be mounted to the bicycle frame F in a conventional manner. The base member 40 is configured to support the electrical actuator 38. Also, the base member 40 is configured to support the chain guide 36 via the first and second linkages 41 and 42. The chain guide 36 is configured to displace the bicycle chain BC Specifically, the electrical actuator 38 is operatively coupled to the chain guide 36 to displace the chain guide 36 via the second linkage 42. Here, as seen in FIG. 2, the electrical actuator 38 includes an electrical motor 38a. Also, the electrical actuator 38 includes a motor driver 38b, which is a circuit that is operatively coupled to the electrical motor 38a to control the operation of the electrical motor 38a. The electrical motor 38a is a reversible electrical motor that is mechanically connected to the chain guide 36 by a motor driven part (e.g. including a gear reduction mechanism and/or the second linkage 42). The electrical motor 38a and the motor driver 38b are disposed inside an actuator housing 38c (see FIG. 3). The electrical motor 38a has an output shaft 38d that is connected to the second linkage 42 via a gear reduction mechanism 44 (partially shown in FIGS. 6 and 7). An output shaft 44a of the gear reduction mechanism 44 protrudes from the actuator housing 38c. The second linkage 42 is connected to the output shaft 44a of the gear reduction mechanism 44. The gear reduction mechanism 44 has a fan gear 44b fixedly mounted on the output shaft 44a for turning the output shaft 44a which in turn moves the chain guide 36 via the first and second linkages 41 and 42.

The derailleur 20 is connected to the power source 26 by a power line 46, which can be either directly connected to the power source 26, as shown or via an electrical wiring junction. The derailleur 20 further includes a shift controller 48 that is disposed inside the actuator housing 38c (see FIG. 3). The shift controller 48 is provided on a printed circuit board that also includes the circuitry of the motor driver 38b. In response to a user input of the shift operating device 16 or an automatic shift command from the cycle computer 24, the shift controller 48 controls the operation of the electrical motor 38a using the motor driver 38b to move the chain guide 36. The shift controller 48 includes a power line communication module (not shown) for carrying out power line communications with the other electric bicycle components and the detection devices that electrically connected to the power source 26. The functions of the shift controller 48 can be provided by a remotely located controller provided on one of the other electric bicycle components such as the cycle computer 24. For the sake of brevity, the shift controller 48 will be referred to hereinafter as the controller 48.

Still referring to FIG. 2, the detecting device 30 includes a strain gauge disposed on a part of the derailleur 20 that receives a reaction force from the chain guide 36 displacing the bicycle chain BC. The detecting device 30 is configured to detect information related to a reaction force of the bicycle chain BC. The part of the derailleur 20 with the strain gauge includes at least one of the chain guide 36, the first or second linkages 41 and 42 interconnecting the electrical actuator 38 to the chain guide 36, and a gear (e.g., the gear 44*b*) that is connected to the motor 38*a* of the electrical actuator 38. In other words, the strain gauge is configured to be attached to the at least one of the chain guide 36, a linkage part of the first or second linkages 41 and 42, and the gear (e.g., the gear 44*b*). In the illustrated embodiment, the detecting device 30 includes three strain gauges S1, S2 and S3 that are provided on an inner guide plate 36*a* of the chain guide 36. The detecting device 30 preferably includes three strain gauges to more accurately detect the reaction force of the bicycle chain BC. Preferably, a plurality of the strain gauges (e.g. three strain gauges) is attached to the inner guide plate 36*a* along a longitudinal direction of the inner guide plate 36*a*. In this embodiment, the strain gauges are attached to an outer surface of the inner guide plate to avoid directly contacting the bicycle chain BC. It will be apparent to those skilled in the bicycle field that any number of strain gauges can be applied to the chain guide 36.

In addition to, or alternatively, the detecting device 30 includes a strain gauge S4 that is provided to the first linkage 41. In addition to, or alternatively, the detecting device 30 includes a strain gauge S5 that is provided to the second linkage 42. In addition to, or alternatively, the detecting device 30 includes a strain gauge S6 that is provided to the gear 44*b* that is connected to the motor 38*a* of the electrical actuator 38. However, the reaction force of the bicycle chain BC can be detected in other ways as explained below.

As the detected chain reaction force becomes smaller, the rotational degree of output shaft 38*d* of the electrical motor 38*a* also becomes smaller. Thus, the displacement amount of the chain guide 36 becomes shorter as the detected chain reaction force becomes smaller. As the detected chain reaction force becomes larger, the rotational degree of output shaft 38*d* of the electrical motor 38*a* also becomes larger. Thus, the displacement amount of the chain guide 36 becomes longer as the detected chain reaction force becomes larger. If the strain gauge of the detecting device 30 detects a sudden drop in the detected chain reaction force, then the controller 48 stops the chain guide 36 or moves the chain guide 36 back to prevent chain dropping. In this way, the electrical motor 38*a* can be controlled by the controller 48 so that the bicycle chain BC avoids contact with the chain guide 36 while the chain guide 36 is in a resting position (while the chain guide 36 is not in a shifting operation.).

In the moment of the sudden drop of the chain reaction force, the controller 48 can determine whether the bicycle chain BC is engaged with a chain rise rivet (spike pin) (outward shifting), or determine whether the bicycle chain BC is disengaged from a larger sprocket (inward shifting). Thus, after the moment, the bicycle chain BC will engage with the larger (or smaller) sprocket. However if the detected reaction force is large and the chain guide 36 be displaced too much, then the controller 48 is programmed to move the chain guide 36 back (retracted slightly) after a predetermined time period from the moment of detecting the sudden drop of the chain reaction force.

In the illustrated embodiment, the electric bicycle derailleur control system 12 further includes the detecting devices 32. mentioned above, and a detecting device 50, discussed below, for indirectly detecting information related to a reaction force of the bicycle chain BC. It will be apparent to those skilled in the bicycle field that only one of the these detecting devices 30, 32 and 50 is needed for providing the information related to a reaction force of the bicycle chain BC. Thus, two of the detecting devices 30 (strain gauges), 32 (torque sensor) and 50 (current sensor) can be omitted from the electric bicycle derailleur control system 12 illustrated in FIG. 2. However, the electric bicycle derailleur control system 12 can be provided with one or more of these detecting devices 30, 32 and 50 as desired.

Figure 4:
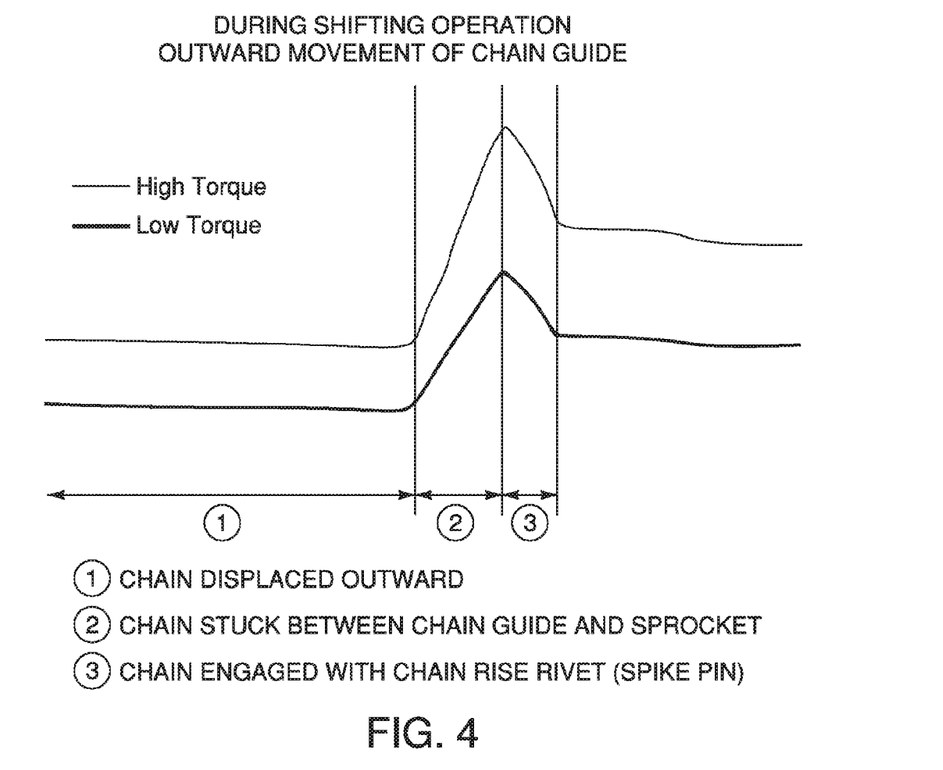
FIG. 4 is a graph illustrating a change in the torque over a period of time that includes movement of the chain guide from the retracted position to the extended position.
Figure 7:
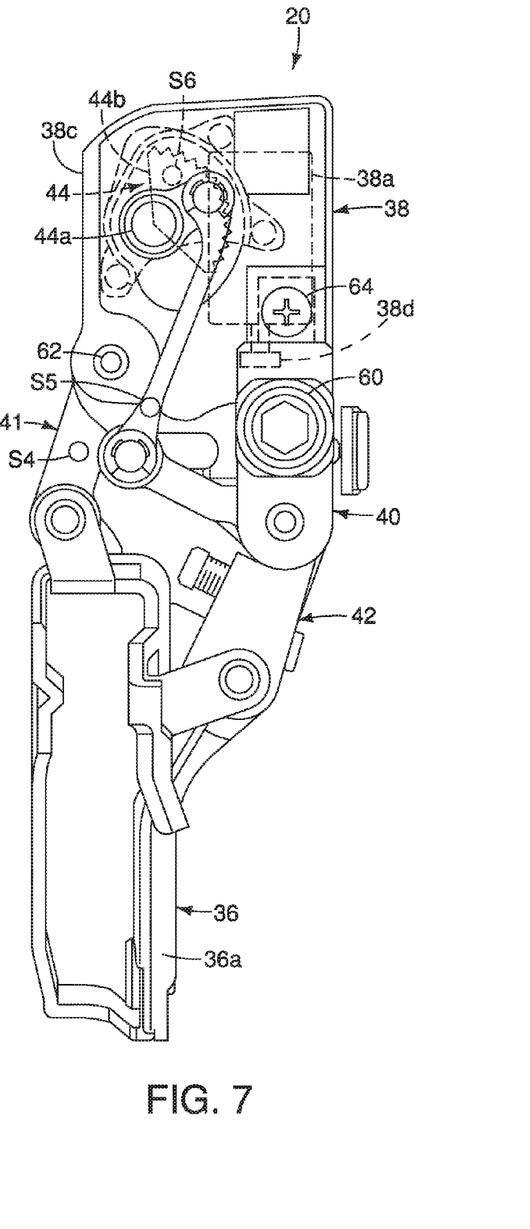
FIG. 7 is an front elevational view of the front derailleur illustrated in FIGS. 3 and 6 having the chain guide in the extended position, and the front cover removed and a portion of the output shaft cover broken away.
Figure 8:
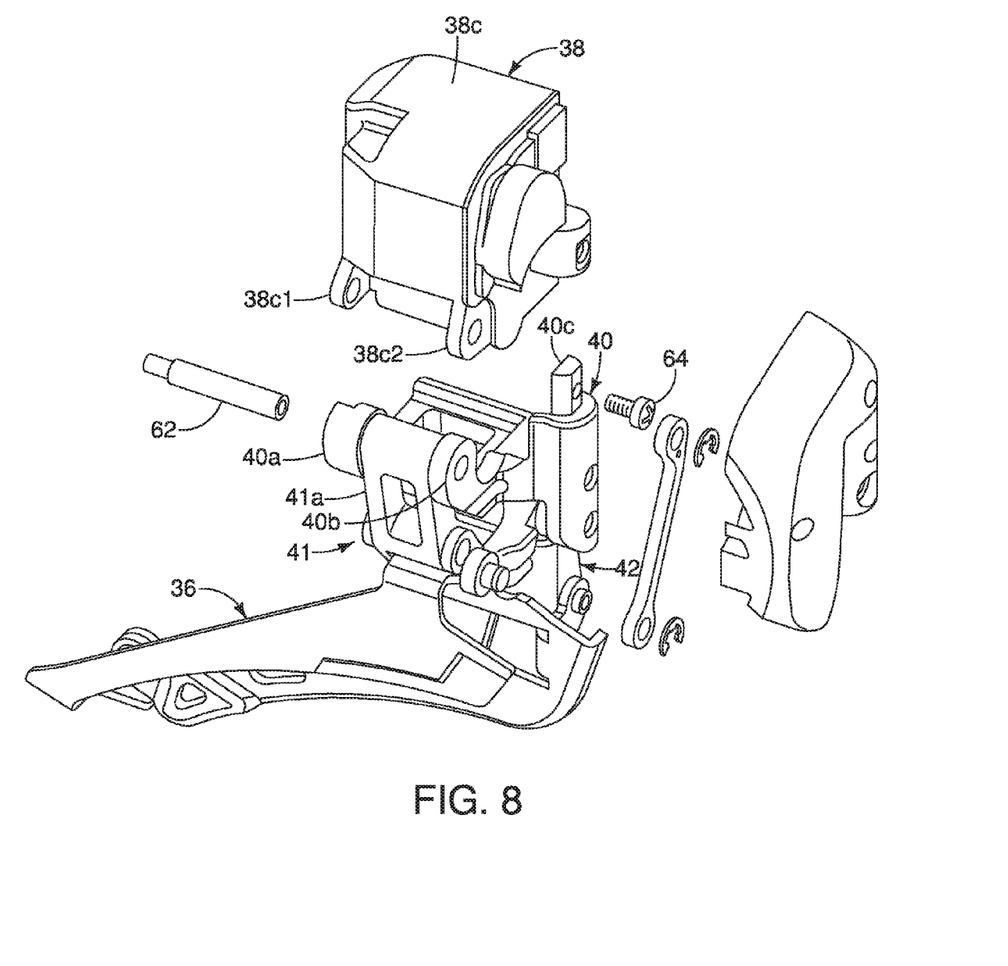
FIG. 8 is a partially exploded perspective view of the front derailleur illustrated in FIGS. 3, 6 and 7.
Figure 9:
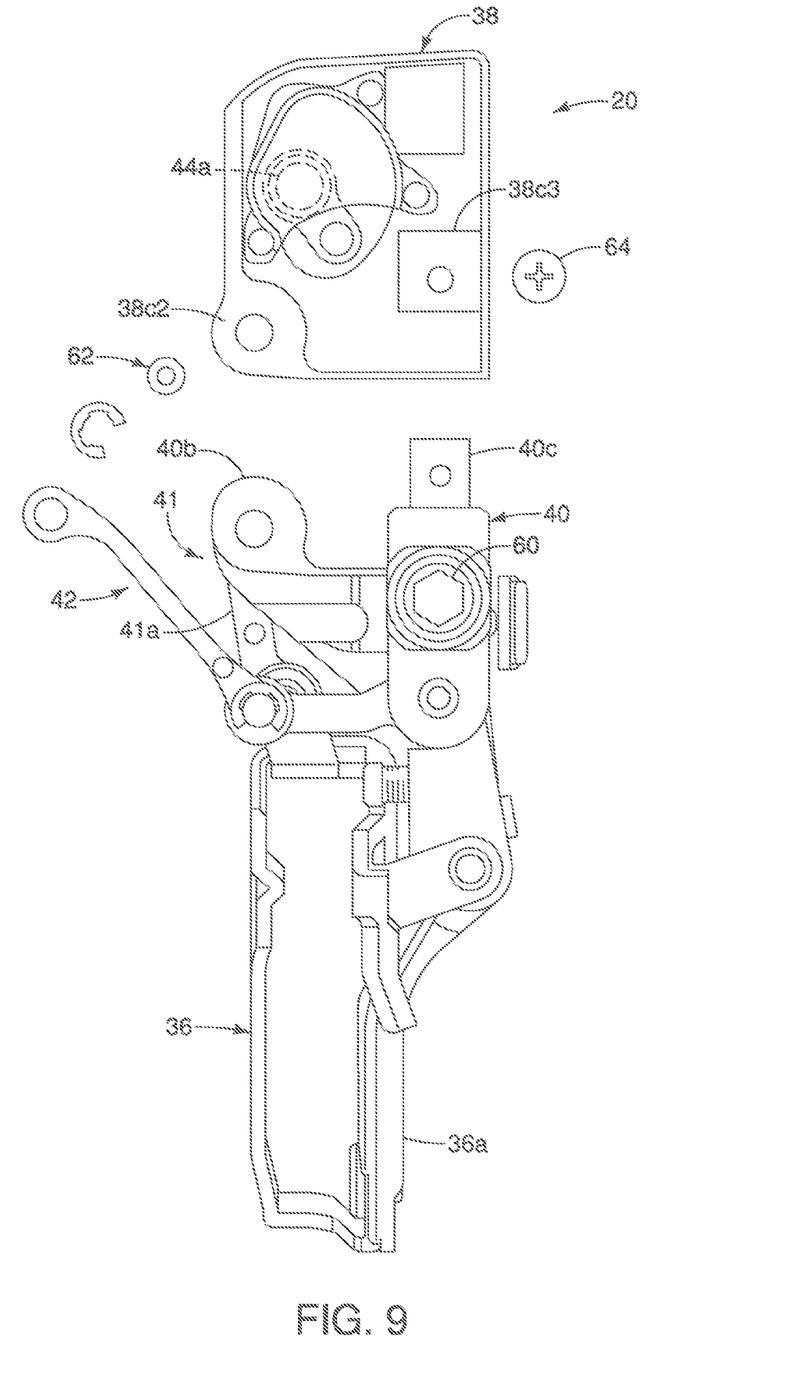
FIG. 9 is a partially front elevational view of the front derailleur illustrated in FIGS. 3 and 6 to 8.

In the case of the detecting device 32, the electric bicycle derailleur control system 12 includes the detecting device 32 that includes a torque sensor that is configured to measure torque of a bicycle component. The bicycle component includes at least one of a crank axle, a crank arm, a pedal and a rear hub to which the torque sensor is to be provided. Thus, the detected information related to a reaction force of the bicycle chain BC can be provided by the torque sensor of the detecting device 32, which indirectly detects information related to a reaction force of the bicycle chain BC. This is because, a chain tension during the shifting operation increases in accordance with a pedaling force that is detected by the torque sensor. Thus, the torque sensor can indirectly detect an increase of the chain reaction force if the detected torque increases since the torque is related to the chain tension that is assumed to be in proportion to the chain reaction force during the shifting operation FIG. 4 is a graph illustrating a change in the torque over a period of time that includes movement of the chain guide 36 from the retracted position (FIG. 6) to the extended position (FIG. 7). As the detected torque becomes smaller, the rotational degree of output shaft 38*d* of the electrical motor 38*a* also becomes smaller. Thus, the displacement amount of the chain guide 36 becomes shorter as the detected torque becomes smaller. As the detected torque becomes larger, the rotational degree of output shaft 38*d* of the electrical motor 38*a* also becomes larger. Thus, the displacement amount of the chain guide 36 becomes longer as the detected torque becomes larger. If the torque sensor of the detecting device 32 detects a sudden drop in the chain reaction force, then the controller 48 stops the chain guide 36 or moves the chain guide 36 back to prevent chain dropping In this way, the electrical motor 38*a* can be controlled by the controller 48 so that the bicycle chain BC avoids contact with the chain guide 36 while the chain guide 36 is in a resting position.

Figure 5:
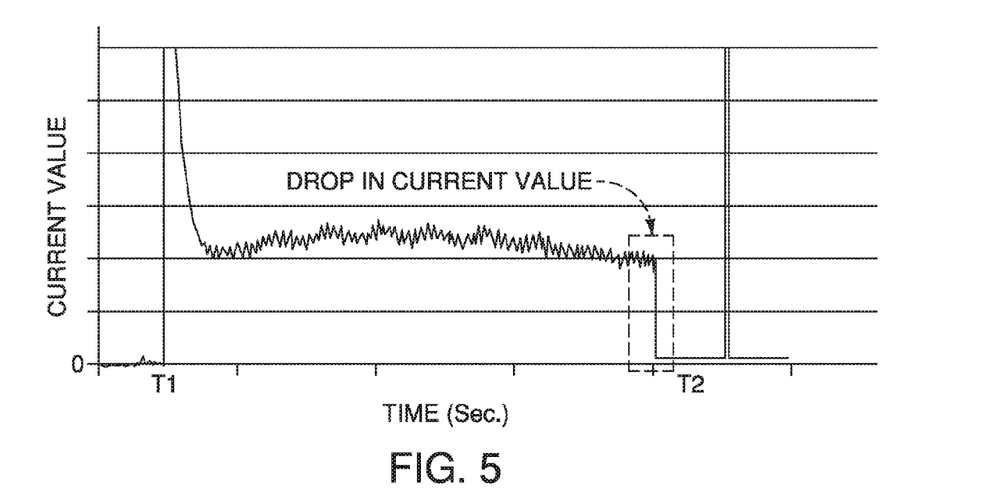
FIG. 5 is a graph illustrating a change in the motor current of the motor over a period of time that includes movement of the chain guide from the retracted position to the extended position.

In the case of the detecting device 50, on the other hand, the electric bicycle derailleur control system 12 includes the detecting device 50 that includes a current sensor that is configured to measure current of the electrical actuator 38. The current sensor of the detecting device 50 indirectly detects information related to a reaction force of the bicycle chain BC. This is because, the current increases if the chain reaction force increases during the shifting operation, since high current is needed to rotate the output shaft 38*d* against a resistance force as the chain reaction force. In the case of using the current sensor of the detecting device 50, the controller 48 is further configured to control the electrical actuator 38 to displace the chain guide 36 according to a detected current value of the electrical actuator 38 by the current sensor such that a displacement amount of the chain guide 36 varies based on the detected current value of the electrical actuator 38. Also the controller 48 is further configured to control a rotational degree of the output shaft 38*d* of the motor 38*a* based on the detected information. FIG. 5 is a graph illustrating a change in the motor current of the electrical motor 38*a* over a period of time that includes movement the chain guide 36 from the retracted position (FIG. 6) to the extended position (FIG. 7). As the motor current of the electrical motor 38*a* becomes smaller, the rotational degree of output shaft 38*d* of the electrical motor 38*a* also becomes smaller. Thus, the displacement amount of the chain guide 36 becomes shorter as the motor current of the electrical motor 38*a* becomes smaller. As the motor current of the electrical motor 38*a* becomes larger, the rotational degree of output shaft 38*d* of the electrical motor 38*a* also becomes larger. Thus, the displacement amount of the chain guide 36 becomes longer as the motor current of the electrical motor 38*a* becomes larger. If the current sensor of the detecting device 50 detects a sudden drop in the motor current of the electrical motor 38*a*, then the controller 48 stops the chain guide 36 or moves the chain guide 36 back to prevent chain dropping. In this way, the electrical motor 38*a* can be controlled by the controller 48 so that the bicycle chain BC avoids contact with the chain guide 36 while the chain guide 36 is in a resting position.

The controller 48 is configured to control the electrical actuator 38 in accordance with the detected information from one or more of the detecting devices 30, 32 and 50. More specifically, the controller 48 is configured to control the electrical actuator 38 so that the chain guide 36 is displaced from a rest position to a first shift position when the detected information indicates a detected chain reaction force being smaller than a first predetermined amount. In other words, the controller 48 is further configured to control the electrical actuator 38 so that a displacement amount of the chain guide 36 during a shifting operation is a first displacement amount upon the detected information of the at least one of the detecting devices 30, 32 and 50 indicating a detected chain reaction force being smaller than a first predetermined amount.

Also the controller 48 is further configured to control the electrical actuator 38 so that the chain guide 36 is displaced from the rest position to a second shift position that is further from the rest position than the first shift position when the detected information indicates the detected chain reaction force being equal to or above the first predetermined amount. In other words, the controller 48 is further configured to control the electrical actuator 38 so that the displacement amount of the chain guide 36 is a second displacement amount that is greater than the first displacement amount upon the detected information of the at least one of the detecting devices 30, 32 and 50 indicating a detected chain reaction force being equal to or above the first predetermined amount.

In the controller 48 determines that the chain guide 36 may be moved too far in a current displacement direction due to over shifting, the controller 48 executes a chain dropping prevention operation. Specifically, the controller 48 is further configured to control the electrical actuator 38 to displace the chain guide 36, that is in a shifting operation in which the displacement amount of the chain guide 36 is the second displacement amount, in an opposite direction from an existing displacement direction upon the detected information of the at least one of the detecting devices 30, 32 and 50 indicating a detected chain reaction force decreasing rate that is equal to or above a predetermined chain reaction force decreasing rate, i.e. the chain reaction force drops suddenly during the shifting operation. It is possible for the controller 48 to control the electrical actuator 38 such that the chain guide is moved in the opposite direction before the chain guide 36 reaches the second shift position when the at least one of the detecting devices 30, 32 and 50 detects the chain reaction force decreasing rate that is equal to or above the predetermined chain reaction force decreasing rate.

The controller 48 is further configured to control the electrical actuator 38 to displace the chain guide 36 in the opposite direction after the at least one of the detecting devices 30, 32 and 50 detects the chain reaction force decreasing rate within a prescribed time period (e.g. 0 to 10 milliseconds). In other words, the controller 48 controls the electrical actuator 38 to displace the chain guide 36 in the current displacement direction for a prescribed time period to complete the shifting operation. After that, the at least one of the detecting devices 30, 32 and 50 will detect a decrease in the chain reaction force due to engagement of the bicycle chain with the target one of the front sprockets, since at that time the bicycle chain BC tends to leave away from the chain guide 36. Within a prescribed time period (e.g. 0 to 10 milliseconds), the controller 48 will reverse the electrical motor 38*a* to slightly move the chain guide 36 in the opposite direction. Alternatively, the controller 48 is further configured to control the electrical actuator 38 to stop displacing the chain guide 36 after the at least one of the detecting devices 30, 32 and 50 detects the chain reaction force decreasing rate. Whether the controller 48 merely stops the chain guide 36 or moves the chain guide 36 in the opposite direction after the detecting device 30 detects the chain reaction force decreasing rate can be set by the user based on a selected gear ratio (i.e., determined by the engagement of the bicycle chain BC with the front and rear sprockets FS and RS) or preprogramed to be either of them.

The controller 48 is further configured to control the electrical actuator 38 to stop displacing the chain guide 36, that is in a shifting operation in which the displacement amount of the chain guide 36 is the second displacement amount, in an existing displacement direction upon the detected information of the at least one of the detecting devices 30, 32 and 50 indicating a detected chain reaction force decreasing rate that is equal to or above a predetermined chain reaction force decreasing rate.

In this way, the controller 48 can determine the appropriate displacement amount of the chain guide 36 is in accordance with detected reaction force of the bicycle chain BC with the chain guide 36. For example, if detected reaction force of the chain is large, the displacement amount of the chain guide 36 is controlled to be large in order to certainly engage the bicycle chain BC to a target one of the front sprockets FS against the reaction force of the bicycle chain BC. In contrast, if the detected reaction force of the bicycle chain BC is small, the displacement amount of the chain guide 36 is controlled to avoid displacing the chain guide 36 of the derailleur 20 too much.

When torque of a bicycle component is used as the detected information, the controller 48 is configured to control the electrical actuator 38 to displace the chain guide 36 according to a detected torque of the bicycle component by the torque sensor of the detecting device 32 such that the chain guide 36 is displaced from a rest position to a first shift position when the detected torque is smaller than a first predetermined amount, and such that the chain guide 36 is displaced from the rest position to a second shift position, that is further from the rest position than the first shift position, when the detected torque is equal to or above the first predetermined amount Since the torque sensor of the detecting device 32 does not directly detect a chain reaction force, the controller 48 can control the displacement amount of the chain guide 36 in accordance with the detected information from the torque sensor of the detecting device 32 at just before starting the shifting operation. In such the case, the detected information does not correspond to the chain reaction force but a chain tension when the shifting operation starts.

By using the detecting device 30 (i.e., one of the strain gauges S1 to S6) that detects chain reaction force, it is possible to adjust the position of the chain guide 36 even when chain guide 36 is not being shifted. For example, if the detecting device 30 detects a chain reaction force which is smaller than predetermined degree and continuously detects it more than predetermined period, then the controller 48 can determine that the bicycle chain BC is touching the chain guide 36. To avoid a touching noise, the controller 48 actuates the electrical motor 38a to move the chain guide 36 to a trim position. In other words, the controller 48 is further configured to control the electrical actuator 38 to displace the chain guide 36 to a trim position upon the detected information of the detecting device 30 indicating a detected chain reaction force being smaller than a predetermined amount for more than a predetermined time period. The term "trim position" refers to a chain guide position that is slightly offset from being centered over the engaged sprocket.

As seen in FIG. 2, the derailleur 20 can optionally be provided with a position sensor 52 to aid in shifting the chain guide 36 by actuating the electrical motor 38a. The position sensor 52 can be a potentiometer that includes a stationary electrical contact plate and a movable electrical brush plate, or a photo interrupter having a light source or LED disposed on one side of a shutter wheel and a light detector such as a phototransistor disposed on the other side of the shutter wheel. Thus, the detection information from the position sensor 52 is received by the controller 48 to more precisely control the electrical motor 38a for moving the chain guide 36. In this way, the controller 48 can use information indicative of a chain reaction force in conjunction with movement data of the chain guide 36 to accurately control the position of the chain guide 36 differently for each time a shifting operation occurs.

Turning now to FIGS. 6 to 9. the mounting arrangement of the electrical actuator 38 on the base member 40 is described First, the base member 40 is mounted to the bicycle frame F using a bolt 60 (threaded fastener). Thus, the electrical actuator 38 is mounted to the bicycle frame F via the base member 40. The electrical actuator 38 is detachably mounted to the base member 40 by a mounting pin 62 and a screw 64. In particular, the housing 38c of the electrical actuator 38 is provided with a pair of mounting flanges 38c1 and 38c2 and a mounting pocket 38c3, while the base member 40 is provided with a pair of mounting flanges 40a and 40b and a mounting projection 40c. Each of the mounting flanges 38c1, 38c2, 40a and 40b has a hole sized to frictionally receive the mounting pin 62. In this way, the housing 38c of the electrical actuator 38 is secured to the base member 40. The mounting pin 62 is also used to pivotally support an outer link 41a of the first linkage 41 to the base member 40. The mounting projection 40c is sized to fit into a recess formed by the mounting pocket 38c3. The screw 64 passes through a hole in mounting pocket 38c3 and a hole in the mounting projection 40c. and then is screwed into a threaded hole of the housing 38c of the electrical actuator 38. In this way, the housing 38c of the electrical actuator 38 is secured to the base member 40.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the electric bicycle derailleur control system 12. Accordingly, these directional terms, as utilized to describe the electric bicycle derailleur control system should be interpreted relative to a bicycle in an upright riding position on a horizontal surface and that is equipped with the electric bicycle derailleur control system 12. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric bicycle derailleur control system comprising:
    a derailleur including a chain guide to displace a bicycle chain and an electrical actuator operatively coupled to the chain guide to displace the chain guide;
    a detecting device configured to detect information related to a reaction force of the bicycle chain; and
    a controller configured to control the electrical actuator in accordance with the detected information such that a displacement amount of the chain guide during a shifting operation is set in accordance with the reaction force.

2. The electric bicycle derailleur control system according to claim 1, wherein
    the controller is further configured to control the electrical actuator so that the displacement amount of the chain guide during the shifting operation is a first displacement amount upon the detected information of the detecting device indicating a detected chain reaction force being smaller than a first predetermined amount, and that the displacement amount of the chain guide is a second displacement amount that is greater than the first displacement amount upon the detected information of the detecting device indicating a detected chain reaction force being equal to or above the first predetermined amount.

3. The electric bicycle derailleur control system according to claim 2, wherein
    the controller is further configured to control the electrical actuator to displace the chain guide, that is in a shifting operation in which the displacement amount of the chain guide is the second displacement amount, in an opposite direction from an existing displacement direction upon the detected information of the detecting device indicating a detected chain reaction force decreasing rate that is equal to or above a predetermined chain reaction force decreasing rate.

4. The electric bicycle derailleur control system according to claim 2, wherein
    the controller is further configured to control the electrical actuator to stop displacing the chain guide, that is in a shifting operation in which the displacement amount of the chain guide is the second displacement amount, in an existing displacement direction upon the detected information of the detecting device indicating a detected chain reaction force decreasing rate that is equal to or above a predetermined chain reaction force decreasing rate.

5. The electric bicycle derailleur control system according to claim 3, wherein
    the controller is further configured to control the electrical actuator to displace the chain guide in the opposite direction after the detecting device detects the chain reaction force decreasing rate within a prescribed time period.

6. The electric bicycle derailleur control system according to claim 3, wherein
    the controller is further configured to control the electrical actuator to stop displacing the chain guide after the detecting device detects the chain reaction force decreasing rate.

7. The electric bicycle derailleur control system according to claim 1, wherein
    the electrical actuator includes an electrical motor; and
    the controller is further configured to control a rotational degree of an output shaft of the motor based on the detected information.

8. The electric bicycle derailleur control system according to claim 1, wherein
    the detecting device includes a strain gauge disposed on a part of the derailleur that receives a reaction force from the chain guide displacing the bicycle chain.

9. The electric bicycle derailleur control system according to claim 8, wherein
    the part of the derailleur includes at least one of the chain guide, a linkage part of a linkage assembly interconnecting the electrical actuator to the chain guide, and a gear connected to a motor of the electrical actuator.

10. The electric bicycle derailleur control system according to claim 8, wherein
    the controller is further configured to control the electrical actuator to displace the chain guide to a trim position upon the detected information of the detecting device indicating a detected chain reaction force being smaller than a predetermined amount for more than a predetermined time period.

11. An electric bicycle derailleur control system comprising:
    a derailleur including a chain guide to displace a bicycle chain and an electrical actuator operatively coupled to the chain guide to displace the chain guide;
    a detecting device configured to detect information related to a reaction force of the bicycle chain, the detecting device including a current sensor that is configured to measure current of the electrical actuator; and
    a controller configured to control the electrical actuator in accordance with the detected information.

12. The electric bicycle derailleur control system according to claim 11, wherein
    the controller is further configured to control the electrical actuator to displace the chain guide according to a detected current value of the electrical actuator by the current sensor such that a displacement amount of the chain guide varies based on the detected current value of the electrical actuator.

13. The electric bicycle derailleur control system according to claim 1, wherein
    the detecting device includes a torque sensor that is configured to measure torque of a bicycle component.

14. The electric bicycle derailleur control system according to claim 13, wherein
    the bicycle component includes at least one of a crank axle, a crank arm, a pedal and a rear hub.

15. An electric bicycle derailleur control system comprising:

a derailleur including a chain guide to displace a bicycle chain and an electrical actuator operatively coupled to the chain guide to displace the chain guide:

a detecting device configured to detect information related to a reaction force of the bicycle chain; and a controller configured to control the electrical actuator so that the chain guide is displaced from a rest position to a first shift position when the detected information indicates a detected chain reaction force being smaller than a first predetermined amount, and so that the chain guide is displaced from the rest position to a second shift position that is further from the rest position than the first shift position when the detected information indicates the detected chain reaction force being equal to or above the first predetermined amount.

16. An electric bicycle derailleur control system comprising:

a derailleur including a chain guide to displace a bicycle chain and an electrical actuator operatively coupled to the chain guide to displace the chain guide;

a torque sensor configured to measure torque of a bicycle component; and a controller configured to control the electrical actuator to displace the chain guide according to a detected torque of the bicycle component by the torque sensor such that the chain guide is displaced from a rest position to a first shift position when the detected torque is smaller than a first predetermined amount, and such that the chain guide is displaced from the rest position to a second shift position that is further from the rest position than the first shift position when the detected torque is equal to or above the first predetermined amount.

* * * * *